United States Patent [19]

Wheeler

[11] Patent Number: 4,987,322

[45] Date of Patent: Jan. 22, 1991

[54] DRIVER-RECEIVER PAIR FOR LOW NOISE DIGITAL SIGNALING

[75] Inventor: Richard L. Wheeler, San Jose, Calif.

[73] Assignee: Hewlett-Packard Company, Palo Alto, Calif.

[21] Appl. No.: 335,010

[22] Filed: Apr. 7, 1989

[51] Int. Cl.[5] .................. H03K 19/092; H03K 3/01
[52] U.S. Cl. ........................ 307/270; 307/475; 307/443; 307/555
[58] Field of Search ............... 307/270, 475, 443, 572, 307/552, 555, 557, 362; 323/312

[56] References Cited

U.S. PATENT DOCUMENTS

| | | | |
|---|---|---|---|
| 3,737,672 | 6/1973 | Hill et al. | 307/475 |
| 4,147,940 | 4/1979 | Beydler et al. | 307/475 |
| 4,591,742 | 5/1986 | Morito | 307/475 |
| 4,691,128 | 9/1987 | Fruhauf | 307/557 |
| 4,843,262 | 6/1989 | Abe | 307/443 |

Primary Examiner—Stanley D. Miller
Assistant Examiner—Richard Roseen

[57] ABSTRACT

A digital signalling circuit employs a spaced apart driver and receiver pair in which the signal current originates at the receiver and is constant in time. The receiver chip includes a constant current source connected to the power supply plane and one termination of a signal line, a termination resistor connected across the signal line termination to the ground plane, and a sense amplifier connected to the signal line termination for sensing the voltage level or the signal line. The driver chip comprises a single switching transistor connected across the opposite end of the signal line to the ground plane, and is not directly coupled to the power supply plane. When the driver switching transistor is on, the signal line is grounded and the termination resistor in the receiver is effectively shorted out. When the driver switching transistor is turned off, the signal source current at the receiver charges up the signal line and develops a voltage across the termination resistor. Since a constant current source is used, any inductance in the circuit has no effect on the power supply voltage. Power supply bypass capacitors are effectively removed from the circuit reducing signal propagation times.

9 Claims, 2 Drawing Sheets

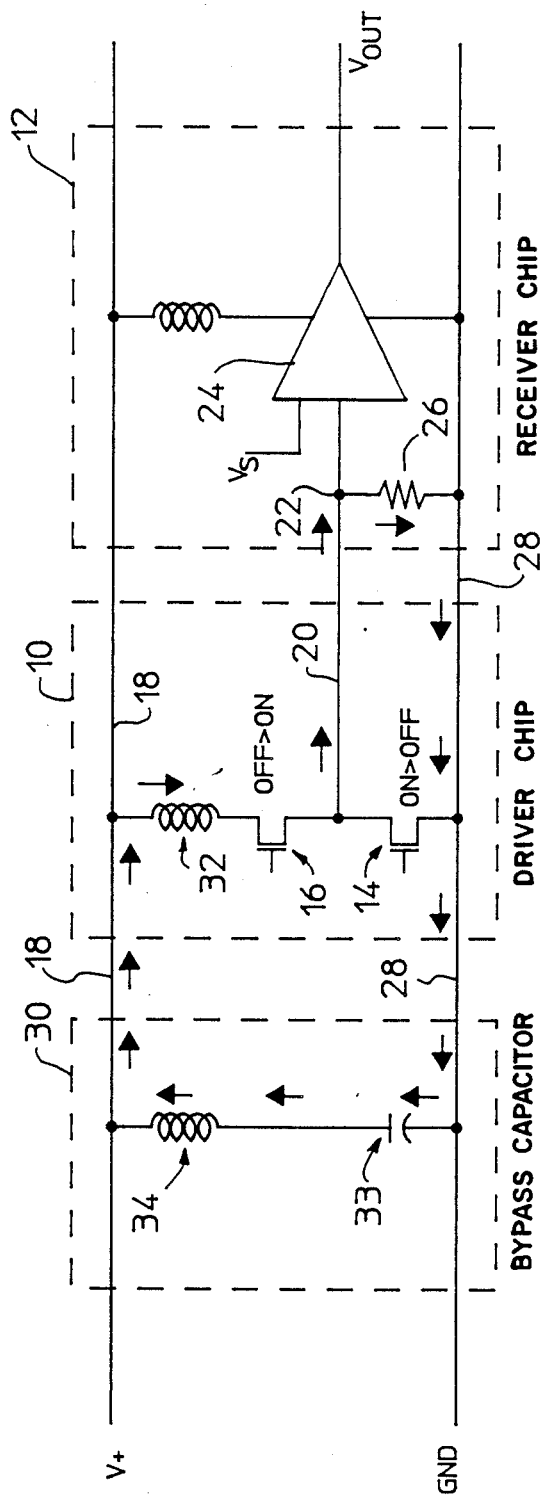
FIG_1 (PRIOR ART)

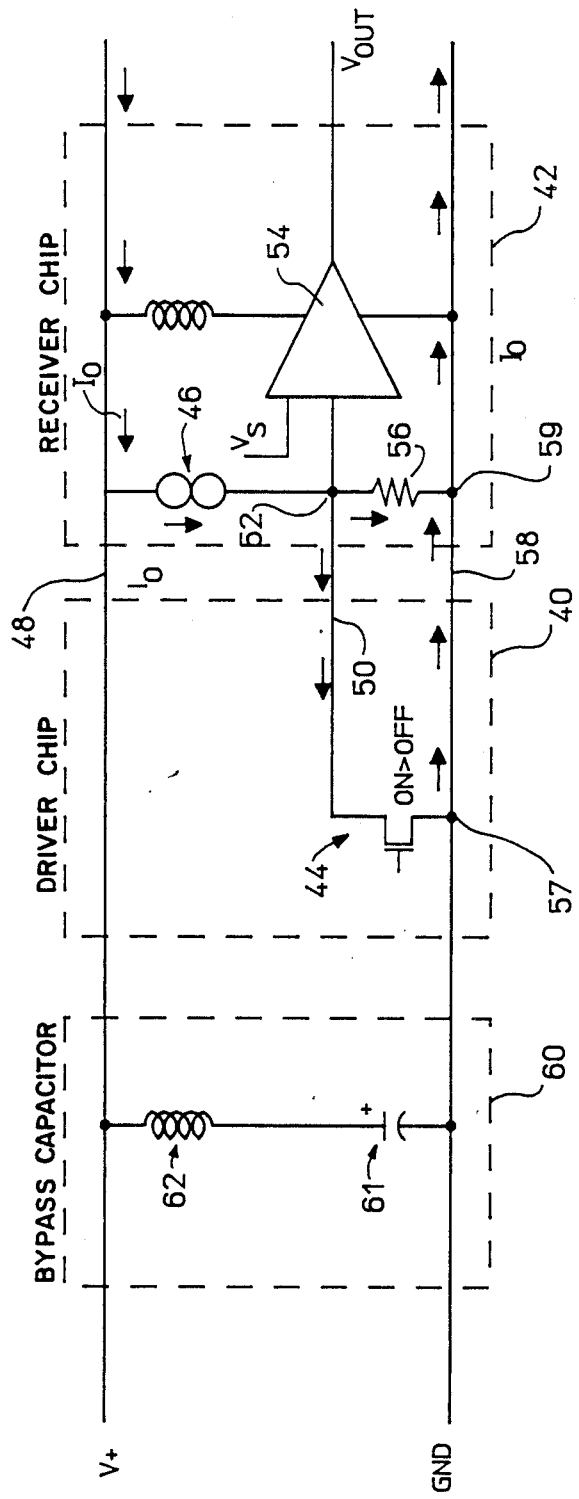
FIG_ 2

DRIVER-RECEIVER PAIR FOR LOW NOISE DIGITAL SIGNALING

TECHNICAL FIELD

The present invention relates to high speed electronic signaling circuits containing digital drivers and receivers.

BACKGROUND ART

High speed signaling circuits, i.e. circuits with switching times under one nanosecond, place severe demands upon the power distribution components of digital circuit boards, i.e. PC boards. Modern PC boards frequently have hundreds of output drivers changing signal levels simultaneously in response to a system clock. The drivers require large instantaneous currents to be delivered from a power supply to charge up the distributed capacitance of the interconnect signal lines. Large voltage drops can result in the power distribution network when the high switching currents are impeded by resistance or inductance. These drops can propagate throughout the power distribution network and, if severe enough, cause logic errors.

A conventional digital driver/receiver pair is shown in FIG. 1, comprising a driver chip 10 and a receiver chip 12, both connected to a power supply plane 18 and a ground plane 28 of a PC board, and communication via a signal output line 20 from driver chip 10 to receiver chip 12. Driver chip 10 includes a pair of transistors 14 and 16 connected in series between the power and ground planes 18 and 28, with transistor 14 being on when transistor 16 is off, and visa versa. In the steady state, when transistor 14 is on, signal line 20 is at a relatively low voltage level, and when transistor 16 is on, signal line 20 is at a relatively high voltage level, which levels can be sensed by an amplifier circuit 24 in receiver chip 12 and compared to a reference voltage $V_s$ to give either a logic low or logic high output $V_{out}$. To switch states on signal line 20 and to send a new logic output to the receiver 12, current, represented here by arrows, must be switched from the power supply plane 18 to the signal output line 20. The signal current flows through signal line 20 to the receiver termination 22 and develops a voltage across the termination resistor 26 to ground. The ground return current flows through the ground plane 28 back towards driver chip 10. Box 30 represents a bypass capacitor somewhere on the PC board which is connected between lines 18 and 28. The circuit inside the box 30 is an equivalent circuit which depicts the bypass capacitor as an ideal capacitor 33 in series with a parasitic inductance 34. Bypass capacitor 30 provides a low impedance return flow path for the signal current so that the signal current does not have to flow through the power supply. The current returns via the bypass capacitor and power supply plane 18 to the switching output device 10, completing the circuit.

There are several problems with the conventional driver circuit just described. One problem already alluded to has to do with power supply noise in the form of voltage drops introduced when high switching currents are impeded by resistance or inductance. The relatively large physical distance between the switching drivers 10 and the power supply bypass capacitor 30 causes increased power supply inductance 32 and 34, which restricts the flow of current to the drivers 10, increasing the noise. Mutual inductance present in the power supply source path 18 causes adjacent signal line coupling through the driver chip 10 and through the power supply bypass capacitor 30, which is located far away from the switch devices 10. Bypass capacitors 30 are ineffective at maintaining constant voltage at fast switching speeds due to the series inductance 34 inherent in any physical capacitor. Power supply noise voltages that have not been properly bypassed propagate throughout the entire PC board and add in amplitude at any given time and location, increasing PC board noise significantly.

Another problem with conventional driver circuits has to do with the signal propagation time through the ground return path 28. The relatively large physical distance between the drivers 10 and the bypass capacitor 30 results in a long return path and a correspondingly long propagation time. A signal traveling in a 60 cm (2 ft) circuit board at half to two-thirds of light speed propagates through the signal line in two to four nanoseconds, then returns through the ground path for about four nanoseconds more. This six to eight nanosecond signal delay is comparable in size to the ten nanosecond rise times for signal pulses of TTL and CMOS circuits. A signal pulse is such, and not spurious noises, only because it is larger than its own propagation delay time. Unfortunately, the long return paths of conventional driver circuits are incompatible with the one to three nanosecond pulse rise times of ECL circuits and the 0.2 nanosecond second pulse rise times of GaAs circuit technologies. It is an object of the present invention to provide a digital switching circuit, i.e. a driver/receiver pair, which minimizes the voltage drops in the power distribution methods that occur during switching.

It is another object of the present invention to provide a digital switching circuit with a significantly reduced signal propagation delay time.

DISCLOSURE OF THE INVENTION

The above objects have been met with a driver/receiver pair in which the source of the signal current originates at the receiver, instead of at the driver, and remains constant with time. The switching circuit includes a driver having a switching transistor for providing a relatively low-impedance electrical signal flow path between a first end of a signal line and a ground plane when in an "on" or closed-current state and for interrupting the signal flow path when in an "off" or open-circuit state. The circuit also includes a receiver at a location spaced some distance away from the driver. The receiver includes a resistor connected between the signal line and the ground plane for providing a relatively high-impedance electrical signal flow path and a constant current source connected to draw power from a power supply plane and supply an electrical signal to the signal line. The receiver also has a sensing amplifier or other means at a second end of the signal line opposite from the driver for sensing the voltage level on the signal line relative to the ground plane. The switching transistor and any other components of the driver circuit are not connected to the power supply plane and receive electric power only from the receiver via the signal line.

The voltage level on the signal line is switched by switching the on/off state of the switching or "drive" transistor. However, the switching voltage signal originates at the second or "receiver" end of the signal line. Whenever the switching transistor is in an open circuit configuration or "off" state, current flows through the resistor in the receiver to the ground plane and a relatively high signal voltage develops on the signal line. But whenever the transistor is in a closed circuit configuration "on" state, the current flows through the signal line and transistor to the ground plane and the resistance across the signal line to the ground plane is effectively shorted so that a relatively low signal voltage develops on the signal line. Finally, the signal voltage, high or low, is sensed at the receiver end by a sensing amplifier or the like and compared to a reference voltage to provide a logic high or logic low output. The constant current source tends to isolate the power supply plane from any switching transients which result from charging or discharging stray impedances associated with the signal line.

BRIEF DESCRIPTION OF THE DRAWINGS

FIG. 1 is a schematic of a conventional digital switching circuit of the prior art.

FIG. 2 is a schematic of a digital switching circuit of the present invention.

BEST MODE FOR CARRYING OUT THE INVENTION

With reference to FIGS. 1 and 2, both the conventional signaling circuit in FIG. 1 and the signaling circuit of the present invention in FIG. 2 include a driver chip 10 or 40, and a receiver chip 12 or 42 communicating via a signal line 20 or 50. However, the driver chip 10 of the conventional circuit has a pair of switching transistors 14 and 16 connected in series between a power supply plane 18 and a ground plane 28, while driver chip 40 of the present invention only has one switching transistor 44 which is not directly connected to and does not draw power from the power supply plane or bus 48. Any components in the driver circuit in addition to the switching transistor which might be present may not be connected to draw power from the power supply plane as this would introduce additional current paths that would need to be bypassed by a power supply bypass capacitor 60. Further, the receiver chip 42 of the present invention includes a constant current source 46 which is connected to draw electrical current from the power supply plane 48 and supply it to the signal line 50 at a constant rate, while the receiver chip 12 of the conventional circuit has no such constant current sources. Accordingly, the two circuits are quite different in operation. In the signaling circuit of the present invention in FIG. 2, the source of signal current originates at the receiver 42 and remains constant with time, while in the conventional switching circuit in FIG. 1, the source of signal current originates at the transmitter 10 and is not constant.

In FIG. 2, when the output transistor 44 is on, the signal source current, represented by arrows, flows through signal line 50 to the driver chip 40 which shorts out the termination resistor 56 in receiver 42 across signal line 50 and ground plane 58, creating a logical low signal on line 50 that can be sensed by an amplifier 54 connected to signal line 50 at termination node 52. When transistor 44 of driver chip 40 is turned off, the signal source current at the receiver 42 first charges up any stray capacitances associated with signal line 50, and then develops a voltage across the termination resistor 56, which gives to line 50 a logical high signal that is sensed by amplifier 54.

Since a constant current source 46 is used at the receiver 42, no change in current $I_o$ is required from the power supply plane 48, regardless of whether transistor 44 in driver chip 40 is on, off or switching states, fixing the DC voltage drops. The constant current source 46 effectively shields the PC board main power supply on power supply plane 48 from amplifier 54. The effect of transistor 44's state is merely whether the available current $I_o$ through signal line termination node 52, is channeled through signal line 50 and transistor 44 to ground plane 58, or channeled directly to ground plane 58 via termination resistor 56. The current provided, typically about 20 mA, can be adjusted to improve the DC noise margins. Signal line 50 and ground return path 58 between nodes 57 and 59 together are laid out like a transmission line terminated with an impedance 56 across nodes 52 and 59 in receiver 42 and a switch 44 in driver 40. The characteristic impedance of this transmission line is typically between 30 to 100 ohms. Preferably, the resistance of termination resistor 56 substantially matches, within 5%, the transmission line characteristic impedance. Though the circuit would work less well if the impedance were not matched, such matching is not an absolute requirement.

In the switching circuit of FIG. 2, the chip power in receiver chip 42 is constant, leading to constant chip temperature and therefore better noise margins. Another advantage relates to the power supply bypass capacitor represented by box 60 as an equivalent ideal capacitor 61 and a parasitic inductance 62. Due to the constant current required by the driver/receiver pair 40 and 42, the parasitic inductance 62 of the power supply bypass capacitor 60 has less detrimental effect. The long path problem causing signal propagation delays is effectively eliminated by removing the bypass capacitor 60 from the signal circuit. Only the relatively short propagation times on the signal line 50 and the return path 58 between termination points 57 and 59 are involved. In conventional circuit designs, like that in FIG. 1, the process control of both driver and receiver chips 10 and 12 determines the noise margin, while in the present invention, the logical high signal voltage level and threshold level is determined only by the receiver chip 42 process parameters, not by the driver chip 40. This fact increases the noise immunity of the driver/receiver pair.

Just like the amplifier 24 of the prior art in FIG. 1, the sense amplifier 54 in FIG. 2 uses a reference voltage $V_s$ for comparison with the relatively high or low voltage on signal line 50 to produce the high or low logic output $V_{out}$. This reference voltage $V_s$ input into amplifier 54 along with the signal voltage on line 50 is developed in the receiver circuit 42, and can be fixed at a predetermined value during manufacture by known fabrication steps. In prior driver/receiver pairs, the high and low signal voltages are determined by the transistor parameters of switching transistors 14 and 16 on the driver chip 10, while the reference voltage $V_s$ is determined by the receiver chip 12. Because in the driver/receiver pair of the present invention the high and low signal voltages are determined by current $I_o$ from source 46 and the resistance of termination resistor 56 in the receiver chip 42, and the reference voltage $V_s$ is also determined by the receiver chip 42, these parameters can be designed to track one another independently of the driver chip 40 so as to give better noise immunity.

The type of circuit board which may be used is not limited to the classical FR4 board of glass-epoxy construction, and may include other high performance board constructions made from ceramic, plastics, Teflon, and like dielectric materials, and may also include multilayer board constructions. The digital switching circuit of the present invention is applicable to all high performance digital integrated circuits in either silicon or GaAs fabrication technologies. While the circuits in both the conventional designs in FIG. 1 and the present invention in FIG. 2 are shown using MOS transistor devices for the switches 14, 16, and 44, bipolar transistors may also be used. Switching times are usually faster than 5 nanoseconds.

I claim:

1. A digital signaling circuit comprising,
   a driver circuit at a first location having switching means operative when in a closed-circuit configuration to provide a relatively low-impedance flow path for an electrical signal between a first end of a signal line and a ground plane and when in an open-circuit configuration to interrupt said flow path, and
   a receiver circuit at a second location spaced a distance from the first location having sense means operative to sense a voltage level between a second end of the signal line and the ground plane, the receiver circuit including:
      a constant current source which draws electrical power from a power supply plane and which is operative to provide an electrical signal to the signal line, and
      terminating impedance means operative to provide a relatively high-impedance flow path between the second end of the signal line and the ground plane,
   whereby when the switching means is in an open circuit configuration the signal flows through the impedance means to the ground plane, developing a relatively high first voltage level between the signal line and the ground plane and when the switching means is in a closed circuit configuration the signal flows through the signal line and the switching means to the ground plane, developing a relatively low second voltage level between the signal line and the ground plane, the signal having approximately the same magnitude when the high voltage is being developed and when the low voltage is being developed, the constant current source tending to isolate the power supply plane from any switching transients which result from charging or discharging stray impedances associated with the signal line.

2. A digital signaling circuit comprising:
   a driver circuit at a first location having switching means operative when in a closed-circuit configuration to provide a relatively low-impedance flow path for an electrical signal between a first end of a signal line and a ground plane and when in an open-circuit configuration to interrupt said flow path, and
   a receiver circuit at a second location spaced a distance from the first location, said receiver and driver circuits being mounted on a common circuit board, the receiver circuit having sense means operative to sense a voltage level between a second end of the signal line and the ground plane, the receiver circuit including:
      a constant current source which draws electrical power from a power supply plane and which is operative to provide an electrical signal to the signal line, and
      terminating impedance means operative to provide a relatively high-impedance flow path between the second end of the signal line and the ground plane,
   whereby when the switching means is in an open circuit configuration the signal flows through the impedance means to the ground plane, developing a relatively high first voltage level between the signal line and the ground plane and when the switching means is in a closed circuit configuration the signal flows through the signal line and the switching means to the ground plane, developing a relatively low second voltage level between the signal line and the ground plane, the constant current source tending to isolate the power supply plane from any switching transients which result from charging or discharging stray impedances associated with the signal line.

3. The circuit of claim 2 wherein said signal line and said ground plane are laid out on the common circuit board in transmission line relation having a characteristic impedance, said terminating impedance means having a resistance that substantially matches said characteristic impedance.

4. The circuit of claim 3 wherein said characteristic impedance is in the range of 30 to 100 ohms.

5. A digital signaling circuit comprising:
   a driver circuit at a first location having switching means that switches states in less than 5 nanoseconds and that is operative when in a closed-circuit configuration to provide a relatively low-impedance flow path for an electrical signal between a first end of a signal line and a ground plane and when in an open-circuit configuration to interrupt said flow path, and
   a receiver circuit at a second location spaced a distance from the first location having sense means operative to sense a voltage level between a second end of the signal line and the ground plane, the receiver circuit including:
      a constant current source which draws electrical power from a power supply plane and which is operative to provide an electrical signal to the signal line, and
      terminating impedance means operative to provide a relatively high-impedance flow path between the second end of the signal line and the ground plane,
   whereby when the switching means is in an open circuit configuration the signal flows through the impedance means to the ground plane, developing a relatively high first voltage level between the signal line and the ground plane and when the switching means is in a closed circuit configuration the signal flows through the signal line and the switching means to the ground plane, developing a relatively low second voltage level between the signal line and the ground plane, the constant current source tending to isolate the power supply plane from any switching transients which result from charging or discharging stray impedances associated with the signal line.

6. A digital signaling circuit comprising:
   a driver circuit at a first location having switching means operative when in a closed-circuit configuration to provide a relatively low-impedance flow path for an electrical signal between a first end of a signal line and a ground plane and when in an open-circuit configuration to interrupt said flow path, and a receiver circuit at a second location spaced a distance from the first location having sense means comprising a first input connected to a second end of said signal line, said first input receiving a voltage level developed between said signal line at said receiver circuit and the ground plane, a second input connected so as to receive a reference voltage developed by said receiver circuit, and comparator means communicating with said first and second inputs for comparing said voltage level on said signal line and said reference voltage, and producing a logic output signal in response to results of said comparison, the receiver circuit including:

a constant current source which draws electrical power from a power supply plane and which is operative to provide an electrical signal to the signal line, and terminating impedance means operative to provide a relatively high-impedance flow path between the second end of the signal line and the ground plane, whereby when the switching means is in an open circuit configuration the signal flows through the impedance means to the ground plane, developing a relatively high first voltage level between the signal line and the ground plane and when the switching means is in a closed circuit configuration the signal flows through the signal line and the switching means to the ground plane, developing a relatively low second voltage level between the signal line and the ground plane, the constant current source tending to isolate the power supply plane from any switching transients which result from charging or discharging stray impedances associated with the signal line.

7. A digital signaling circuit comprising:

a circuit board having a power supply with a ground plane and a power supply plane, a driver chip mounted on said circuit board, the driver chip having a switch connected to a signal line and to said ground plane, a receiver chip mounted on said circuit board, but spaced apart from the driver chip, the receiver chip connected to said signal line and to said ground plane across a terminating resistor, the receiver chip having a constant current supply connected to said power supply plane and to said terminating resistor in a manner wherein the constant current supply furnishes current to said signal line and said terminating resistor whereby current on said signal line flows from said receiver chip to said driver chip on the signal line and then from the driver chip to the receiver chip in the ground plane when said switch is closed and flows through said terminating resistor but not in said signal line when said switch is open, the current having approximately the same magnitude whether the switch is open or closed, and means for sensing whether current is flowing through the resistor.

8. The circuit of claim 7 wherein said signal line and said ground plane are laid out on the circuit board in transmission line relation having a characteristic impedance, said terminating resistor having a resistance that substantially matches said characteristic impedance.

9. A method of switching a voltage level on a signal line, the method comprising the steps of:

switching an on-off state of a drive transistor, said transistor connected across a first end of a signal line and a ground plane that together define a transmission line, supplying a constant current from a power supply plane to a receiver end of said signal line distant to said first end, said current charging any stray impedance associated with said signal line and developing a high signal voltage on said signal line across a resistance connected between the receiver end of the signal line and said ground plane whenever said drive transistor is in an off state, said current flowing through said signal line and said drive transistor to said ground plane whenever said driver transistor is in an on state, whereby said resistance across said signal line to said ground plane is shorted by said drive transistor and a low signal voltage develops on said signal line, the current having approximately the same magnitude regardless of the state of the drive transistor, and sensing said signal voltage on said signal line at said receiver end.

* * * * *